United States Patent
Raksha et al.

(10) Patent No.: US 7,238,424 B2
(45) Date of Patent: Jul. 3, 2007

(54) ALL-DIELECTRIC OPTICALLY VARIABLE PIGMENTS

(75) Inventors: Vladimir P. Raksha, Sanat Rosa, CA (US); Paul T. Kohlmann, Windsor, CA (US); Richard A. Bradley, Santa Rosa, CA (US); Charles K. Carniglia, Santa Rosa, CA (US); Alberto Argoitia, Santa Rosa, CA (US); Roger W. Phillips, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 174 days.

(21) Appl. No.: 10/741,896

(22) Filed: Dec. 19, 2003

(65) Prior Publication Data
US 2005/0132929 A1 Jun. 23, 2005

Related U.S. Application Data

(63) Continuation-in-part of application No. 10/365,090, filed on Feb. 11, 2003, now Pat. No. 6,815,065.

(60) Provisional application No. 60/384,629, filed on May 31, 2002.

(51) Int. Cl.
*B32B 5/16* (2006.01)
*C09D 4/00* (2006.01)

(52) U.S. Cl. ............... 428/403; 106/31.65; 428/913

(58) Field of Classification Search ............. 428/403, 428/913; 106/31.65
See application file for complete search history.

(56) References Cited

U.S. PATENT DOCUMENTS

| | | |
|---|---|---|
| 3,123,490 A | 3/1964 | Bolomey et al. ......... 106/291 |
| 3,858,977 A | 1/1975 | Baird et al. ............. 356/71 |
| 3,981,568 A | 9/1976 | Bartolomei ............. 350/317 |
| 4,434,010 A | 2/1984 | Ash ..................... 106/291 |
| 4,626,445 A | 12/1986 | Doborowolski et al. ..... 427/7 |
| 4,705,356 A | 11/1987 | Berning et al. ......... 350/166 |
| 4,940,636 A | 7/1990 | Brock et al. ........... 428/426 |
| 5,135,812 A * | 8/1992 | Phillips et al. ........ 428/403 |

(Continued)

FOREIGN PATENT DOCUMENTS

| | | |
|---|---|---|
| EP | 0 753 545 A2 | 1/1997 |
| WO | WO95/12569 | 5/1819 |
| WO | WO93/23481 | 11/1993 |
| WO | WO98/53011 | 11/1998 |
| WO | WO 03/006558 A | 1/2003 |
| WO | WO03/011980 | 2/2003 |

OTHER PUBLICATIONS

Lotz et al., Thick Optical Multi-layer Systems on PET Film, Precision, Applied Films, 30-33 (Nov. 2001).

(Continued)

*Primary Examiner*—H. Thi Le
(74) *Attorney, Agent, or Firm*—Allen, Dyer, Doppelt, Milbrath & Gilchrist, P.A.

(57) ABSTRACT

The light transmitted and reflected by all-dielectric optically variable pigments varies according to viewing angle. The color travel of an all-dielectric optically variable pigment depends on amplitude changes and wavelength shifts in reflectance peaks of the pigment. The width and center wavelength of reflectance peaks can be controlled by selecting the ratio of thicknesses between high-index and low-index layers in a thin film stack. Reflectance peaks can regenerate or become suppressed and shift with tilt angle, thus providing a wide variety of color trajectories.

9 Claims, 5 Drawing Sheets

U.S. PATENT DOCUMENTS

| | | | | |
|---|---|---|---|---|
| 5,200,855 | A | 4/1993 | Meredith, Jr. et al. | 359/588 |
| 5,214,530 | A | 5/1993 | Coombs et al. | 359/359 |
| 5,569,535 | A * | 10/1996 | Phillips et al. | 428/403 |
| 5,624,076 | A | 4/1997 | Miekka et al. | 241/3 |
| 5,653,792 | A * | 8/1997 | Phillips et al. | 106/400 |
| 5,744,223 | A | 4/1998 | Abersfelder et al. | 428/206 |
| 5,907,436 | A | 5/1999 | Perry et al. | 359/576 |
| 5,914,817 | A | 6/1999 | Browning et al. | 359/634 |
| 5,926,317 | A | 7/1999 | Cushing | 359/588 |
| 6,068,691 | A | 5/2000 | Miekka et al. | 106/403 |
| 6,112,388 | A | 9/2000 | Kimoto et al. | 29/17.3 |
| 6,132,873 | A | 10/2000 | Dietz et al. | 428/404 |
| 6,165,260 | A | 12/2000 | Gale | 106/439 |
| 6,168,100 | B1 | 1/2001 | Kato et al. | 241/1 |
| 6,193,794 | B1 | 2/2001 | Schmid et al. | 106/415 |
| 6,261,684 | B1 | 7/2001 | Takahashi et al. | 428/345 |
| 6,284,032 | B2 | 9/2001 | Andes et al. | 106/436 |
| 6,344,367 | B1 | 2/2002 | Naya et al. | 438/32 |
| 6,383,638 | B1 | 5/2002 | Coulter et al. | 428/403 |
| 6,749,936 | B2 | 6/2004 | Argoitia et al. | 428/402 |
| 6,841,238 | B2 * | 1/2005 | Argoitia et al. | 428/323 |
| 2003/0031870 | A1 * | 2/2003 | Argoitia et al. | 428/403 |
| 2003/0224164 | A1 * | 12/2003 | Argoitia et al. | 428/403 |

OTHER PUBLICATIONS

"Angle-Dependent Optical Effects Deriving from Submicron Structures of Films and Pigments", Pfaff G. et al, Chemical Reviews, ACS, Washingdon, DC, USA Vo. 99, No. 7, 1999, pp. 1963-1981, XP002219038; ISSN: 0009-2665 Sections II and V.

Alberto Argoitia, "Pigments Exhibiting a Combination of Thin Film and Diffractive Light Interference", AIMCAL 2002 Fal Itechnical Conference Meeting (Oct. 20, 2002).

Argoitia and Witzman, "Pigments Exhibiting Diffractive Effects", Soc. Of Vac. Coaters, 45th Annual Tech. Conf. Proceed. 2002.

Van Renesse (Ed.), "Optical Document Security", 2nd Ed. Artech House, pp. 254, 349-69, 1997.

* cited by examiner

ALL-DIELECTRIC OPTICALLY VARIABLE PIGMENTS

CROSS-REFERENCE TO RELATED APPLICATIONS

The present application is a continuation-in-part of U.S. patent application Ser. No. 10/365,090 filed Feb. 11, 2003 now U.S. Pat. No. 6,815,065, which claimed priority from U.S. Patent Application No. 60/384,629 filed May 31, 2002, which are incorporated herein by reference for all purposes.

STATEMENT REGARDING FEDERALLY SPONSORED RESEARCH OR DEVELOPMENT

Not applicable.

Reference to Microfiche Appendix

Not applicable.

Field of the Invention

The present invention relates generally to pigments, and more particularly to optically variable dichroic pigment flakes used in paints, inks, and other products.

BACKGROUND OF THE INVENTION

Interference pigments and devices are well known. Usually, optically-variable thin-film pigment flakes are prepared either by chemical deposition of dielectric layers onto flaked substrates or by deposition of combinations of transparent dielectric layers, semi-opaque metal layers, and metal reflecting layers onto a flexible web in vacuum to form a multilayered thin film interference structure. The structure is released later from the web after deposition in vacuum and sized in subsequent technological process. The metal-dielectric interference structure typically has at least one metal reflecting layer, at least one transparent dielectric layer and at least one semi-transparent metal layer, while all-dielectric interference structures are built from dielectric layers with different indices of refraction. Various combinations of these layers can be utilized to achieve the desired optically variable effect.

Changes of color in a pigment result from the interference of light beams reflected from thin layers of the stack. When an incident light beam encounters the first layer of a metal-dielectric-metal interference pigment, one fraction of the light is reflected back and the other fraction passes through the first layer into the second. The transmitted portion of the beam is then partially reflected by the third layer and retransmitted through the second layer. A fraction of the reflected wave passes through the first layer where it may constructively or destructively interfere with the light reflected from the surface of the filter. Maximum destructive reflective light interference occurs when the thickness of the layers are an odd number of quarter waves, whereas maximum constructive light interference occurs when the thickness of the layers are an even number of quarter waves.

The color reflected from the interference pigment depends on the path length of light passing through the dielectric material. When the pigment is observed with light at normal incidence, a certain color is seen, orange for example. When the angle of incidence and internal reflection in the interference pigment increases, the optical path length through the dielectric material becomes shorter than at normal incidence and the color reflected from the surface will change to green. At normal observation angle or angle of incident light, the curve of spectral reflectance of the pigment may have one or several peaks in the long wave range of the visible spectrum. When the angle increases the peak or peaks shift to the area of short wavelengths causing change of a reflected color from orange to green.

Color-shifting optical interference devices are used to authenticate products and documents because copies of such articles made on conventional color printers do not achieve the color-shifting effect(s). Optical interference devices are applied as foils or printed. In one example, an all-dielectric or metal-dielectric metal multilayered optical stack was applied to a substrate, such as a sheet of paper, as an optical foil. The optical stacks were made from vacuum-deposited metal films and dielectric films having low and high indices of refraction. The authenticating devices appeared red when viewed normally. As the angle of observation increased from the normal, their peak reflectance gradually shifted towards the blue part of the spectrum ("down-spectrum shift").

Optically variable devices are also made by applying color-shifting flakes in a suitable vehicle, such as a paint vehicle or an ink vehicle, to a surface. Metal-dielectric-metal color-shifting thin film flakes and coatings have been formed by deposition of a semi-transparent metal layer upon a flexible web, followed by a dielectric layer, a metal reflecting layer, another dielectric layer, and finally another semi-transparent metal layer. The thin film layers are ordered in a symmetric fashion so that the same intended color is achieved regardless of which lateral face is directed towards the incident radiation.

All-dielectric designs have the same reflectance from either side, whether they are symmetrical or not. All-dielectric dichroic paint flakes had an optical design $(L/2\ H\ L/2)^n$ where L and H designated a quarterwave optical thickness of the low and high refractive index materials, respectively, such that L/2 represented an eighth-wave optical thickness of low refractive index material. Reflective colors of all-dielectric flakes were unsaturated.

Further improvements in the optical characteristics of thin film flakes, which may be used in paints and inks for decorative and anti-counterfeiting applications, have been made. Symmetrical multilayer optical devices (e.g. flakes and foils) were composed either of transparent all-dielectric stacks, or transparent dielectric and semi-transparent metallic layered stacks. In the case of an all-dielectric stack, the optical coating was made of alternating layers of materials with high and low indices of refraction. Suitable materials include zinc sulfide or titanium dioxide for the high index layers, and magnesium fluoride or silicon dioxide for the low index layers. Reflectance peaks move to the short-wave region of the spectrum with increasing observation angle.

Usually, plots of spectral reflectance of the interference pigments have one or several reflectance peaks responsible for appearance of a color. If the plot has one peak, with maximum at 650 nm for example, the color reflected from the pigment will be red. If the plot has two peaks, with maxima at 650 nm and 450 nm for example, the color reflected from the pigment will be magenta in the resultant mixture of red (650 nm) and blue (450 nm) colors. Those who are skilled in the art adjust the color and color shift of the pigment by changing the optical design of the stack to place and shift the peak or peaks of spectral reflectance in the direction providing desirable color change.

However, tuning the optical design of a flake or foil has several limitations in the resultant color performance. First of all, reflectance peaks on the curve of spectral reflectance of the pigment do not shift through the entire length of visible spectrum. This means that the colors of the interference pigment do not cover all four quadrants of the color gamut with increasing observation angle. Another limitation is that the peaks can be wide or narrow. Narrow highly reflective peaks provide clear and saturated colors while wide peaks represent color blends. Presence of a second peak or even several peaks on the curve of spectral reflectance of the pigment makes the color of the pigment less saturated.

Another technique is based on multiple periods of dielectric spacer-metal absorber and constructed on a reflective metal layer. The optical design of the structures provides purposeful suppression of peaks of reflectance to produce additional chromatic effects. It was shown that with utilization of two or more periods it is possible to suppress peaks in a wave form to achieve color shifting effects other that those that can be achieved in a single period design.

To precisely describe color values of an object, it is useful to utilize the XYZ tri-stimulus color coordinate system (CIE XYZ) developed by the Commission Internationale de l'Elclairage (CIE), currently used as a standard in the industry. In this system, colors can be related completely and accurately through the variables X, Y, and Z, which are determined mathematically as the integrals of three distribution functions covering the visible spectrum, which ranges from about 380 nm to about 770 nm, with the reflectance or transmittance curve and the energy distribution of the light source. The variables x, y, and z, which are normalized values of X, Y, and Z, respectively, are known in the art as the chromaticity coordinates, and are routinely used in the industry to quantify aspects of color such as purity, hue, and brightness.

Another standard in the industry is known as the L*a*b* color space defined by CIE. In this color space, L* indicates lightness and a* and b* are the chromaticity coordinates. With respect to the (CIE XYZ) coordinate system, the CIE L*a*b* equations are:

$$L^*=116(Y/Y_w)^{1/3}-16$$

$$a^*=500[(X/X_w)^{1/3}-(Y/Y_w)^{1/3}]$$

$$b^*=200[(Y/Y_w)^{1/3}-(Z/Z_w)^{1/3}]$$

Where $X_w$, $Y_w$, and $Z_w$ are the X, Y, and Z values for a white reference under a specific illuminant.

In the L*a*b* chromaticity diagram, the a* axis is perpendicular to the b* axis, with increasingly positive values of a* signifying deepening chroma of red and increasingly negative values of a* signify deepening chroma of green. Along the b* axis, increasingly positive values of b* signify deepening chroma of yellow, whereas increasingly negative values of b* indicate deepening chroma of blue. The L* axis indicating lightness is perpendicular to the plane of the a* and b* axes. The L* axis along with the a* and b* axes provide for a complete description of the color attributes of an object. Hue h* of a color is an attribute of a visual perception where an area appears to be similar to one of the colors, red, yellow, green, and blue, or to a combination of adjacent pairs of these colors considered in a closed ring. The chroma C* of the color is an attribute of color used to indicate the degree of departure of the color from a gray of the same lightness. Chroma can be calculated as:

$$C^*=(a^{*2}+b^{*2})^{1/2}$$

Chroma equals zero at the center of coordinates and increases according to the distance from the center.

BRIEF SUMMARY OF THE INVENTION

Embodiments of the invention enable all-dielectric optical pigments with unique color properties. Optical designs of pigments according to embodiments of the invention enable production of inks, paints, and other products with large color travel, which in some instances covers all four quadrants of the color plane and in other instances shift rapidly from one color to another. Some embodiments include pigments with significant change in reflectivity outside the range of human vision, such as in the near infrared ("NIR") range. Inks according to embodiments of the present invention are used to provide anti-counterfeit protection to valuable documents, packaging, and articles, as well as for decorative purposes.

A dichroic pigment flake according an embodiment of the present invention has a plurality of thin film layers arranged as $(aH\ bL)^n\ aH$ wherein n is an integer and a and b are multipliers, H representing a layer of high-index material having a first relative index of refraction not less than 2.0 and a quarter-wave optical thickness at a center wavelength $\lambda_0$, and L representing a layer of low-index material having a second relative index of refraction not greater than 1.6 and the quarter-wave optical thickness at $\lambda_0$, and wherein the ratio a:b is an integer ratio between 1:4 and 4:1 with a+b=2 and $\lambda_0$ is a wavelength. The outer layers of dichroic pigment flakes are made of high-index material to facilitate use of the pigment flakes in a low-index carrier or medium, such as a paint vehicle or an ink vehicle. Proper selection of the a:b ratio and selected wavelength $\lambda_0$ can achieve wide color travel or fast color travel. The $m^{th}$-order peaks on the curve of spectral reflectance of the pigment are suppressed by optical design of the stack for the normal observation angle and regenerated as the viewing angle changes (or the flake is tilted).

In some embodiments, the ratio a:b is an integer ratio between 1:4 and 4:1 and (a+b) equals 2 and $\lambda_0$ is a wavelength between 400 nm and 2,200 nm having a second-order reflectivity band of less than 10% reflectance and a fourth-order reflectivity band of less than 10% reflectance at a normal viewing angle.

A dichroic pigment flake according to an embodiment of the present invention has a plurality of thin film layers forming an optical interference structure with a $m^{th}$-order reflectivity peak, where m is an integer greater than 1, the $m^{th}$-order reflectivity peak having a first reflectivity at a first viewing angle and a second reflectivity at a second viewing angle, the first reflectivity and the second reflectivity being expressed as a percentage of total reflectivity, wherein the first reflectivity is less than the second reflectivity by at least 20%.

In a particular embodiment, the first reflectivity is not more than 5% within the $m^{th}$-order reflectivity band at a first viewing angle, and the second reflectivity is not less than 60% at a second viewing angle.

DETAILED DESCRIPTION OF THE INVENTION

1. Introduction

Figure 1:
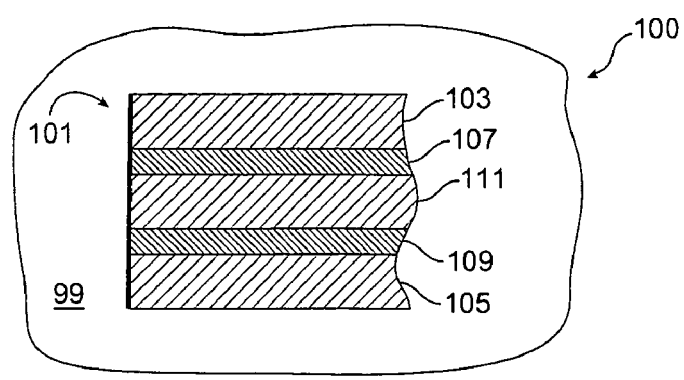
FIG. 1 is a simplified representation of a formulation 100 including a simplified cross section of a dichroic pigment flake 101 surrounded by a carrier 99, such as a clear or tinted paint base or ink vehicle, according to an embodiment.

The process control achievable with vacuum deposition techniques offers the possibility of predictable optically variable pigments and foils. It was discovered that computer modeling of reflectance versus wavelength and color travel, in air or preferably in a carrier with an index of refraction greater than air, such as paint, can be used to design pigment flakes having specific color characteristics without undue trial-and-error experimentation. Use of controllable vacuum thin-film deposition techniques can be used to consistently obtain pigment flakes with the selected optical properties. In particular, it was found that suppression of reflectivity peaks of non-desirable color could produce interference pigments with unique color-shifting characteristics. Such color performance is difficult to achieve by conventional optical design.

One aspect of vacuum deposition techniques is that the layer thickness is typically considered according to its optical thickness, rather than according to a weight percentage of the pigment particle, as with chemical deposition techniques. The optical thickness of a dielectric layer is defined to be the index of refraction n of the material multiplied by the physical thickness d of the layer. A typical measurement of an optical thin-film layer formed by vacuum deposition is the quarterwave optical thickness("QWOT") of the layer. The QWOT is defined as the wavelength at which the optical thickness of the layer is equal to one quarter of the wavelength and is defined generally by the formula:

QWOT=4nd

Layers of different materials having the same QWOT at the same wavelength typically have different physical thicknesses. Generally, a layer of a high-index material will be thinner than a layer of a low-index material having the same QWOT. Even for a given material, layers with the same QWOT might differ in thickness due to differences in stoichiometry or density of the films, which could lead to differences in index of refraction. The reflective and transmissive properties of a thin-film layer depend most strongly on its optical thickness, rather than its physical thickness. Therefore it is often preferable to characterize a layer by its QWOT rather than its physical thickness. Various methods exist for measuring either the optical or physical thickness of a film as it is being deposited. It is generally preferable to use an optical technique that measures the optical thickness directly. For this purpose, transmission or reflection measurements can be made on the thin-film layers as they are being deposited.

An all-dielectric interference pigment consists of a stack of alternating layers of high- and low-index material. The stack may start or end with a layer of either a high- or low-index material. The QWOT of each layer at certain wavelength ($\lambda_0$) is selected to give a desired optical performance. Many pigments consist of a periodic stack of layers in which all of the high-index layers have the same QWOT and all of the low-index layers have the same QWOT, which may be the same or different from the QWOT of the high-index layers.

For example, a conventional interference pigment had a design (0.5 L H 0.5 L)$^n$ where n is the number of periods, and L and H represent low- and high-index layers, respectively, that had a specified QWOT. In other words, the layers represented by L and H were a quarterwave optical thickness at a wavelength $\lambda_0$ of the optical design. The notation 0.5 L represents a layer that is an eighthwave thick (half a quarterwave thickness) at $\lambda_0$. Thus, the basic period consisted of an eighthwave thick layer of the low-index material, a quarterwave thick layer of the high-index material, and an eighthwave thick layer of the low-index material. This period was repeated n times. This pigment had a high reflectance in the spectral region around the design wavelength and had low reflectance and high transmittance over a spectral region of shorter wavelength than the design wavelength $\lambda_0$.

The region of high spectral reflectance on a curve of spectral reflectance of a pigment is called the rejection band, also known as the reflectivity peak. The position of the rejection band is usually determined by the design wavelength of the pigment. For example, a short-wave-pass pigment (0.5 L H 0.5 L)$^3$ designed at $\lambda_0$=620 nm, reflects red, orange, and yellow light in the spectral region around 620 nm. Thus the reflected light would appear yellow. Light at shorter wavelengths is transmitted, so the transmitted light would appear blue. Increasing the number of periods in the stack produces more intense colors of reflected and transmitted light up to a point where the reflectance is close to 100%.

Multilayered dielectric optical pigments are constructed from materials having various indices of refraction. For convenience, coating materials are divided into three groups according to their index of refraction: low-index (less than about 1.6), medium-index (between about 1.6 and 2.0), and high-index (greater than about 2.0). Materials with low refractive indices include magnesium fluoride ($MgF_2$), silicon dioxide ($SiO_2$), and cryolite ($Na_3AlF_6$). Medium-index materials include aluminum oxide ($Al_2O_3$), lanthanum oxide ($La_2O_3$), neodymium oxide ($Nd_2O_3$), yttrium oxide ($Y_2O_3$), and scandium oxide ($Sc_2O_3$). High-index materials include titanium dioxide ($TiO_2$), tantalum pentoxide ($Ta_2O_5$), and zinc sulfide (ZnS). Many other examples of materials exist in each category.

Those of skill in the art will appreciate that some materials indicated as "dielectric" in optical thin film stacks may be described differently in other applications. For example, zinc sulfide may be described and used as a semi-conductor in electronic applications. Similarly, materials such as germanium and silicon can be used as transparent materials in the visible range in optical thin film stacks if the layers are sufficiently thin, for example about 20 nm. Thicker layers can be used where these materials are transparent, such as in the IR region. The relatively high index of refraction of these materials allows for a physically thinner layer for a desired QWOT, which in turn can result in less material used and less deposition time.

II. Exemplary Flake Structure and Formulation

FIG. 1 is a simplified representation of a formulation 100 including a simplified cross section of a dichroic pigment flake 101 surrounded by a carrier 99, such as a clear or tinted paint base or ink vehicle, according to an embodiment of the present invention. The pigment flakes are on the order of about 20–50 microns across and typically about 0.5–2 microns thick, and can be used to print optically variable images on documents, products, and packaging, for example.

The dichroic pigment flake 101 is commonly known as a five-layer stack and has a general configuration of high-low-high-low-high, where "high" represents a thin film layer of material with a high index of refraction ("high-index layer"), and "low" represents a thin film layer of a material with a low index of refraction ("low-index layer"). The layers may have the same optical thickness, or may have different optical thicknesses. In a symmetrical design, the outer high-index layers 103, 105 have the same optical thickness, and the low-index layers 107, 109 have the same optical thickness. The center high-index layer 111, may have the same optical thickness as the two outer high-index layers 103, 105, or a different optical thickness.

Asymmetric designs are also possible in all-dielectric optical stacks. In an asymmetric all-dielectric design, the optical performance is the same from either side. Chemical deposition techniques, such as sol-gel methods, generally produce symmetrical designs. An asymmetric design might have the general configuration of $(aH\ bL)^n\ cH$, for example, where a, b, and c are multipliers of the quarter-wave optical thickness of high-, low- and high-index layers, respectively, at a center wavelength.

The high-index layers could be made of different high-index material, or all the high-index layers could be made of the same high-index material. Similarly, the low-index layers could be made of the same low-index material, or could be made of different low-index materials. Designs could be made with three layers, such as high-low-high, or more than five layers. In particular embodiments the thickness of all the high-index layers is the same and the thickness of all the low-index layers is the same. The ratio of a:b is typically between about 1:4 and 4:1. After the thin film stack is separated from the deposition substrate and processed into flakes, the pigment flakes are "free-standing," that is, the dichroic thin film stack is not supported by a separate flake substrate (e.g. a flake of mica).

While a five-layer design is merely exemplary, and other embodiments might have more layers or fewer layers, it is generally desirable to achieve the desired optical performance in pigments with as few layers as possible. All-dielectric dichroic filters used in other applications, such as stage lighting filters and wavelength-division multilplexing ("WDM") optical filters for telecommunication applications, might have tens, or even over one hundred, thin film layers and incorporate a variety of materials, including medium-index materials, to achieve a precise filter characteristic. Such filters can be relatively expensive, pigment flake often cannot justify the cost of such sophisticated optical designs. Therefore, it is especially desirable to achieve optically variable properties of pigment flakes with few layers. In one embodiment, only high-index and low-index layers are used. In alternative embodiments, pigment flakes include medium-index layers.

There is a general rule regarding the presence and absence of peaks on the curve of spectral reflectance. When the "a" and "b" ratio in the optical stack $(aH\ bL)^n\ aH$ is described as (1:N) or (N:1) where N is an integer, then the peak of (N+1) order is absent, as well as all multiples of (N+1), at a normal viewing angle. For example, in the (1:1) optical stacks at $\lambda_0$, the absent reflectivity peak orders are (1+1)=2, 4, 6, 8, . . . . In a stack, where a:b=1:2, the absent orders would be (2+1)=3, 6, 9, etc.

"Absent" does not mean that there is no measurable reflectance at those wavelengths because slight variations in coating thickness and refractive index may occur in one or more of the layers, resulting in a departure from theoretical reflectance. However, "absent" means that reflectance at the absent orders does not significantly contribute to the perceived color of the flake. In particular embodiments, the reflectance at the absent peak(s) is less than about 20%.

III. Exemplary Flake Design and Optical Performance

The reflectivity and color travel plots shown below in FIGS. 2A–5 were generated using computer simulations, many examples of optical filter simulation programs are commercially available. Such computer simulations have been found to accurately predict the color performance of color-shifting pigment flakes if the manufacturing process used to fabricate the pigment(s) is suitably controllable and repeatable. In particular, computer simulations have been found to be of great utility when combined with vacuum thin film deposition techniques because of the excellent process control vacuum thin film deposition provides for film thickness and composition.

Figure 2A:
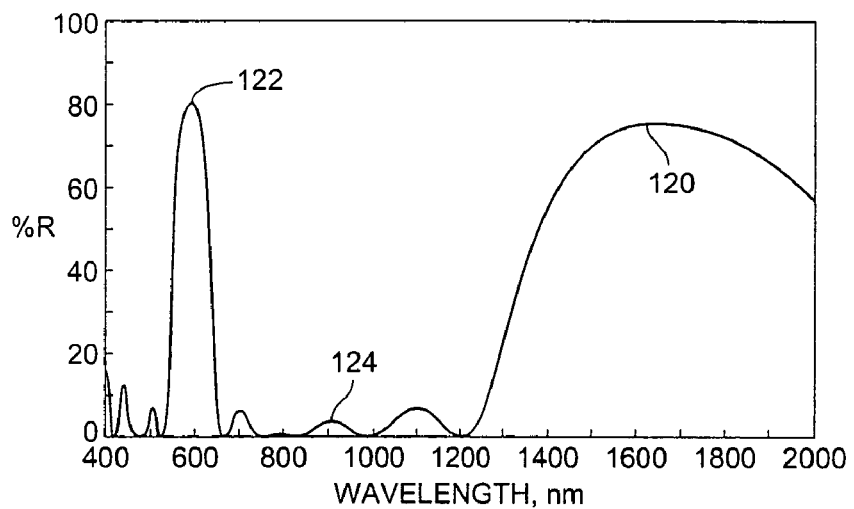
FIG. 2A is a reflectivity plot expected for an all-dielectric pigment flake having an optical stack of H-L-H-L-H designed for 1750 nm at a viewing angle of zero degrees (normal viewing angle).

FIG. 2A is a reflectivity plot expected for an all-dielectric pigment flake having an optical stack of H-L-H-L-H designed for 1750 nm at a viewing angle of zero degrees (normal viewing angle). A $1^{st}$-order peak 120 occurs at 1750 nm and a $3^{rd}$-order peak 122 occurs at 583 nm. The $2^{nd}$- and $4^{th}$-order peaks are essentially absent at 875 nm and 437 nm, respectively. The $1^{st}$-order peak 120 reflects in the infrared region of the spectrum and is not visible to the human eye. The $3^{rd}$-order peak 122 reflects yellow light at 583 nm and the color of the pigment at normal viewing angle appears yellow.

It was thought that complex interactions between the layers in the optical stack as the stack is tilted can result not only in shifting the wavelength of reflectivity peaks to the short waves region, as occurs with conventional color-shifting pigment flakes, but also in the purposeful suppression or regeneration of reflectivity peaks. In other words, not only reflectivity peaks shift to short waves as the sample is tilted, as occurs with conventional color-shifting pigments, but amplitude (% reflectivity) of reflectivity is also changing. It was thought that a higher-order reflectivity peak that had relatively low reflectivity at one viewing angle, and hence contributes little to the color of the sample, would "grow" in amplitude (as well as shift in wavelength) at another viewing angle to produce new and desirable color-shifting effects.

Figure 2B:
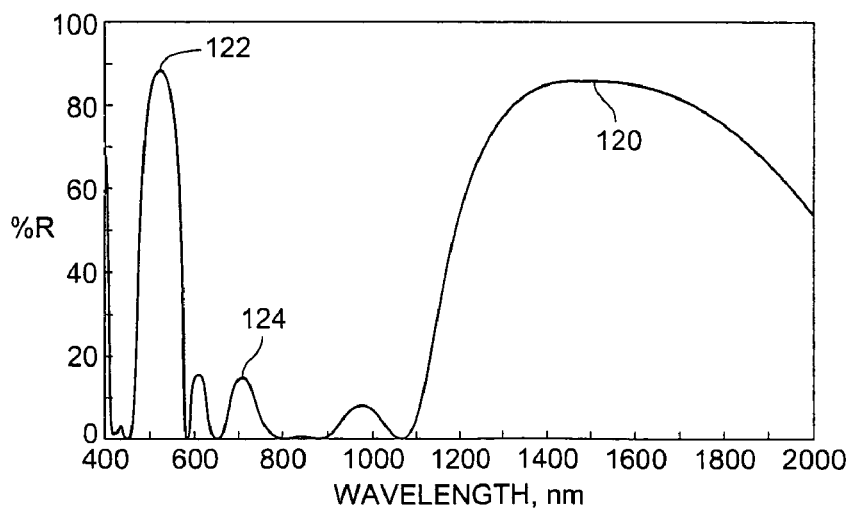
FIG. 2B is a reflectivity plot expected for the all-dielectric color-shifting pigment flake of FIG. 2A at a 30-degree viewing angle from normal.

FIG. 2B is a reflectivity plot expected for the all-dielectric color-shifting pigment flake of FIG. 2A at a 30-degree viewing angle from normal. Tilting the pigment to higher viewing angles causes shift of the peaks 120 and 122 to the shorter waves region, as is known in conventional color-shifting pigment flakes. The $1^{st}$-order peak 120 is still in IR region after the tilt of the pigment to 30 degrees and is not visible while the $3^{rd}$-order peak 122 shifts to 530 nm and reflects green light. The pigment appears green at a viewing angle of 30 degrees.

Figure 2C:
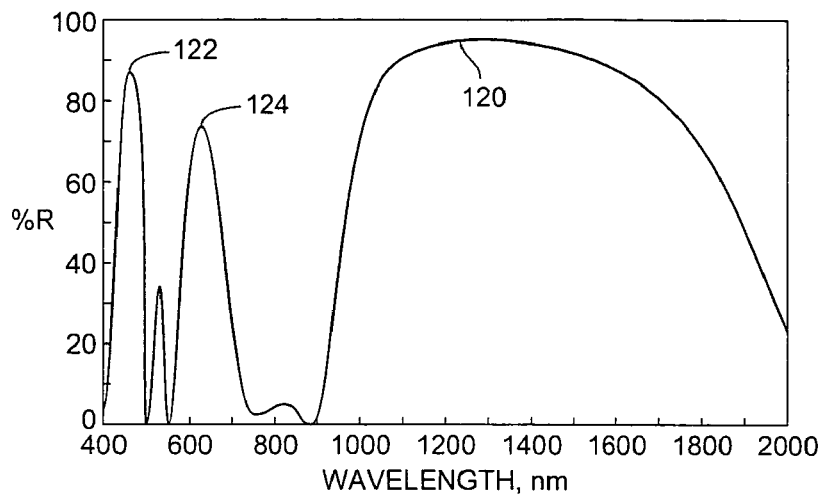
FIG. 2C is a reflectivity plot expected for the color-shifting all-dielectric pigment flake of FIGS. 2A and 2B at a viewing angle of 45 degrees from normal.

FIG. 2C is a reflectivity plot expected for the color-shifting all-dielectric pigment flake of FIGS. 2A and 2B at a viewing angle of 45 degrees from normal. The $2^{nd}$ and $4^{th}$-order peaks, which are suppressed at low viewing angles, start to regenerate (compared to the corresponding peaks at the normal viewing angle). When the pigment H-L-H-L-H with $\lambda_0=1750$ nm is tilted to 45 degrees, $1^{st}$-order peak 120 shifts to 1285 nm, $3^{rd}$-order peak 122 shifts to 460 nm, and $2^{nd}$-order peak 124 regenerates at 625 nm, significantly contributing to the perceived color of the pigment flake. The $3^{rd}$-order peak 122 reflects blue light and the $2^{nd}$-order peak 124 reflects orange light to make a magenta color.

Figure 2D:
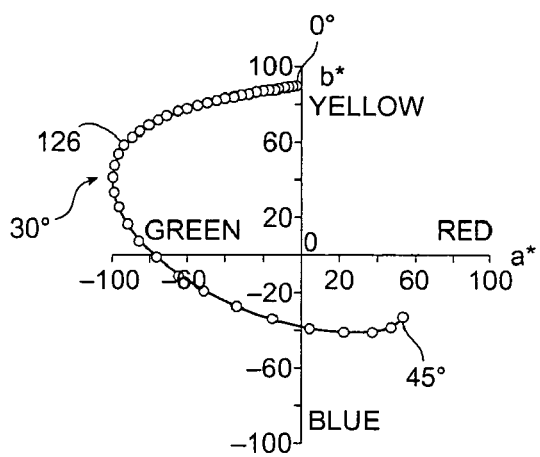
FIG. 2D is a color travel plot expected for the all-dielectric color-shifting interference pigment with optical design H-L-H-L-H at $\lambda_0$=1750 nm shown in FIGS. 2A–2C.

FIG. 2D is a color travel plot expected for the all-dielectric color-shifting interference pigment with optical design H-L-H-L-H at $\lambda_0=1750$ nm shown in FIGS. 2A–2C. The color starts (0 degrees) as yellow at a normal viewing angle and moves to green and blue as the flake is tilted, obtaining a magenta color at a viewing angle of 45 degrees, which covers three quadrants of the L*a*b* space. Data points, represented by "diamonds" along the curve, are calculated in 1-degree steps. Chroma C* is very high through the entire color trajectory (i.e. the coloration is strong for all colors). Chroma of yellow at 0 degrees is 89 units, of green at 30 degrees is 107 units, and of magenta at 45 degrees is 62 units, which is desirably high in contrast to conventional mica-based all-dielectric pigments. It is believed that this color trajectory is achieved because of the regeneration of the $2^{nd}$-order peak (see FIGS. 2A–2C, ref. num. 124), which has a reflectivity of about 5% at normal viewing angle, and about 75% at a 45 degree viewing angle.

Absent this peak regeneration, it is believed that the color trajectory would be much shorter, mostly due to the down-spectrum shift in the $3^{rd}$-order peak (see FIGS. 2A–2C, ref. num. 122) from its initial wavelength of 583 nm to its final wavelength of about 460 nm. A difference between peak reflectivity at different viewing angles of at least about 20% significantly contributes to the perceived color of the flake. For example, a peak that is relatively suppressed and has a first reflectivity at one viewing angle, and that regenerates to a second reflectivity of at least about 20% more than the first reflectivity, can contribute significantly to the color trajectory. In alternative embodiments, the peak regeneration occurs outside the visible spectrum. A peak having a reflectivity of less than 5% at a viewing angle typically does not significantly contribute to the perceived color of the pigment flake; however, even a peak having higher reflectivity can significantly contribute to the color trajectory if it regenerates more than 20%. In particular embodiments it is generally desirable to suppress the reflectivity of the peak as low as possible at one viewing angle, and to regenerate the peak to as high a reflectivity as possible at a second viewing angle.

Presence or absence of reflectivity peaks depends on the angular position of the optical stack. The conventional explanation of color travel (down-spectrum shift) is that it occurs because the optical path of propagating light changes as the thin-film stack is tilted. This theory predicts that the color trajectory generally follows a counterclockwise arc as the center frequency of the reflectivity peak shifts in an essentially well-behaved fashion. The combination of increased optical path and different light propagation in materials with different refractive index enables unique optical designs.

FIGS. 3A–3D illustrate the color performance expected for another embodiment of a thin film interference pigment compared to a metal-dielectric-metal optical design having similar reflectivity at normal incidence. In this example, layers of the low-index material are three times as thick as layers of the high-index material. The optical design of the pigment is 0.5 H-1.5 L-0.5 H-1.5 L-0.5 H at $\lambda_0=1950$ nm. According to the rule, suppressed peaks at normal angle should be (N+1)=(3+1)=4, which can be seen in FIG. 3A. The color performance of this all-dielectric thin film interference pigment is compared to the color performance of a metal-dielectric-metal ("MDM") optical design having a 7 nm thick layer of chromium as the first metal (absorber) layer, a QWOT of low-index dielectric material at 3900 nm, and a layer of opaque aluminum as the second metal (reflector) layer.

Figure 3A:
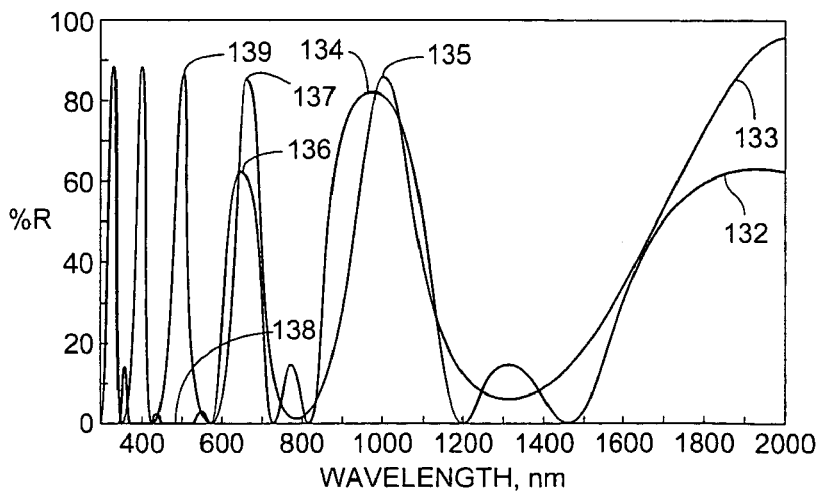
FIGS. 3A–3D illustrate the color performance expected for another example of a thin film interference pigment according to an embodiment of the present invention compared to a metal-dielectric-metal optical design having similar reflectivity at normal incidence.

FIG. 3A shows reflectivity plots at a normal viewing angle expected for the all-dielectric thin film interference pigment compared to the MDM pigment described immediately above. For the all-dielectric thin film interference pigment, the $1^{st}$-order peak 132 at 1900 nm, $2^{nd}$-order peak 134 at about 975 nm and $3^{rd}$-order peak 136 at about 650 nm are present in the plot of spectral reflectance, while the $4^{th}$-order peak 138 at about 500 nm is essentially missing. Color of the pigment at this angle is green (see FIG. 3D). For the MDM pigment, the corresponding $1^{st}$-order peak 133, $2^{nd}$-order peak 135, $3^{rd}$-order peak 137 and $4^{th}$-order peak 139 have higher reflectivity.

Figure 3B:
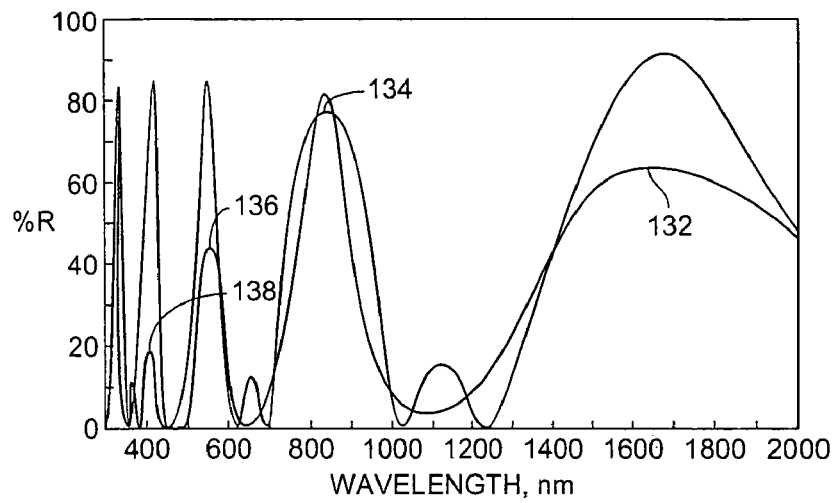

FIG. 3B shows expected reflectivity plots at a viewing angle of 30 degrees for the pigments of FIG. 3A. Tilting the pigments to higher viewing angles causes down-spectrum shift of reflectance peaks to the region of short waves. In the all-dielectric thin film interference pigment, suppression of the $3^{rd}$-order peak 136 and regeneration of the $4^{th}$-order peak 138 begins to occur. After tilting the pigment to 30 degrees, the $1^{st}$-order peak 132 shifts to about 1650 nm and the $2^{nd}$-order peak 134 shifts to about 850 nm. The $3^{rd}$-order peak 136 shifts to about 550 nm and its reflectance amplitude diminishes from about 62% (see FIG. 3A) to about 43%. The $4^{th}$-order peak 138 starts to regenerate at about 420 nm. The $1^{st}$-order peak 132 reflects in near infrared region of the spectrum and is not visible. Color of the pigment moves counterclockwise (see FIG. 3D) with increasing viewing angle.

Figure 3C:
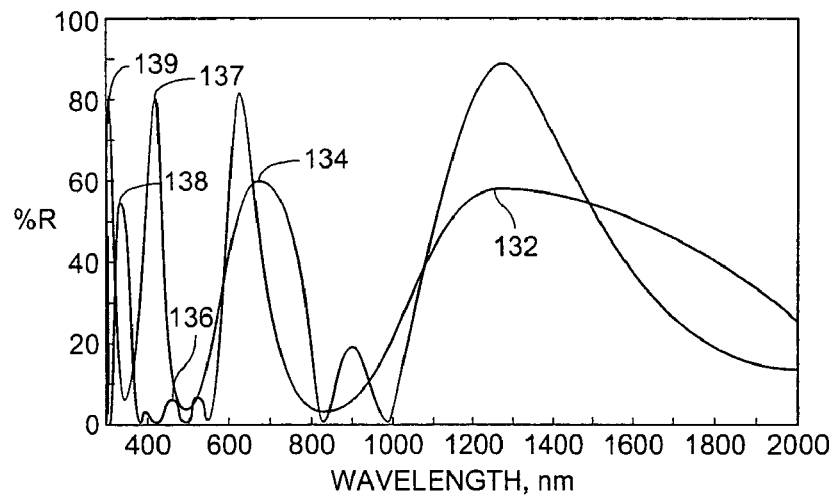

FIG. 3C shows expected reflectivity plots at a viewing angle of 45 degrees for the pigments of FIGS. 3A and 3B. Increasing the viewing angle to 45 degrees further shifts the peaks 132 and 134 to the left in the plot of spectral reflectance. The maximum of the $1^{st}$-order peak 132 shifts to 1015 nm and maximum of the $2^{nd}$-order peak 134 shifts to 522 nm. The $3^{rd}$-order peak gets suppressed while the $4^{th}$-order peak 138 comes to maximum reflectance at 300 nm. As it was shown for lower angles, the $1^{st}$- and $4^{th}$-order peaks are invisible at 45 degrees. In addition, the $3^{rd}$-order peak, which was present at normal incidence, is suppressed. The $2^{nd}$-order peak is the largest on the curve of spectral reflectance. It reflects green light and the color of the pigment becomes green. The entire length of the shift of the $2^{nd}$-order peak 134 to the left is 228 nm (750 nm–522 nm) as the pigment is tilted from 0 degrees to 45 degrees.

Figure 3D:
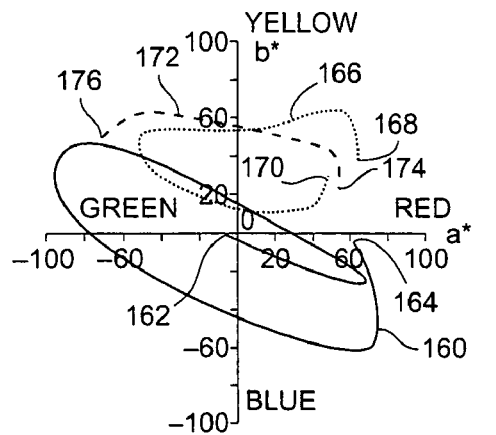

FIG. 3D shows expected color-travel plots of pigments according to embodiments of the invention compared to an MDM pigment. The individual data points are not shown on the color-travel curves to improve clarity of illustration. A first curve 160 shows (in a solid line) the color travel of the MDM pigment of FIGS. 3A–3C from a viewing angle of 0 degrees 162, which is near the origin, and hence essentially white, to a viewing angle of 45 degrees 164. The color travel for the MDM pigment is counterclockwise around the origin, which is typical of conventional color-shifting pigments.

A second curve 166 shows (in a dotted line) the color travel of the all-dielectric thin film interference pigment of FIGS. 3A–3C. The color travel for this all-dielectric pigment is also counterclockwise from a viewing angle of 0 degrees 168 to a viewing angle of 45 degrees 170, but does not travel about the origin, as does the color travel in the first curve 160 for the MDM pigment. The color of this all-dielectric pigment shifts from red to green and back to red without going through the blue region of the color plot. This enables a color-shifting characteristic distinct from the color-shifting characteristic of the MDM pigment.

A third curve 172 shows (in a dashed line) the expected color travel of an all-dielectric thin film interference pigment of the design (1.5 H-0.5 L-1.5 H-0.5 L-1.5 H) with $\lambda_o$=1950 nm. In this design a:b is 3:1, wherein a:b is 1:3 for the optical design represented by the second curve 166. The total color travel of the 3:1 design is only about half (red to green) of the color travel of the 1:3 design (red to green to red). The color travel of the 3:1 design shifts quickly from red to green as the observation angle is increased, and also does not traverse into the blue region of the color plot. FIGS. 3A–3D illustrate unique color travel that can be obtained with embodiments of the invention, even though the total color travel may be less than for a comparable MDM design.

All-dielectric pigments with the optical design (aH bL)$^n$ aH, suppress or regenerate reflectance peaks in the above-described fashion whether a is greater than or less than b. However, where a>b the down-spectrum shift is smaller with a change in observation angle as the down-spectrum shift for peaks of the pigments having the optical design (aH bL)$^n$ aH, where a<b. Larger shift of pigments with thick layers of low-refractive index materials takes place inside of a stack because propagation of the light inside of low-index material occurs faster than in high-index material of the same optical thickness. As a result, color travel of pigments, where layers of a material with high refractive index are thick, frequently covers just two quadrants of the L*a*b* space making so-called "fast color shifters."

Referring to the example shown in FIGS. 2A–2C, the second order peak is regenerated. Referring to the example shown in FIGS. 3A–3C, the third order peak is suppressed. Therefore, both peak regeneration and peak suppression is used to control the color travel of embodiments.

As the angle of incidence increases, the effective ratio a:b increases. Thus, if a:b were 1:1 (e.g. FIGS. 2A–2C) at normal incidence (where orders 2, 4, and 6 are absent), as the angle increases, a:b increases toward 2:1. At an a:b of 2:1, orders 3, 6, and 9 are absent, so as the angle increases, order 2 appears or is "regenerated" and order 3 disappears or is "suppressed".

In a design where the a:b ratio at normal incidence is 1:3 (e.g. FIGS. 3A–3C), the 4$^{th}$-order reflectance peak is absent. As the angle increases, the a:b ratio increases toward 1:2 and the 3$^{rd}$-order reflectance peak is suppressed. The fact that the 4$^{th}$-order peak regenerates is not especially relevant in the optical design associated with FIGS. 3A–3C because it is in the UV portion of the spectrum and doesn't contribute to the color of the pigment flake. In this example, where a<b, an increasing a:b ratio implies that b decreases.

Figure 4A:
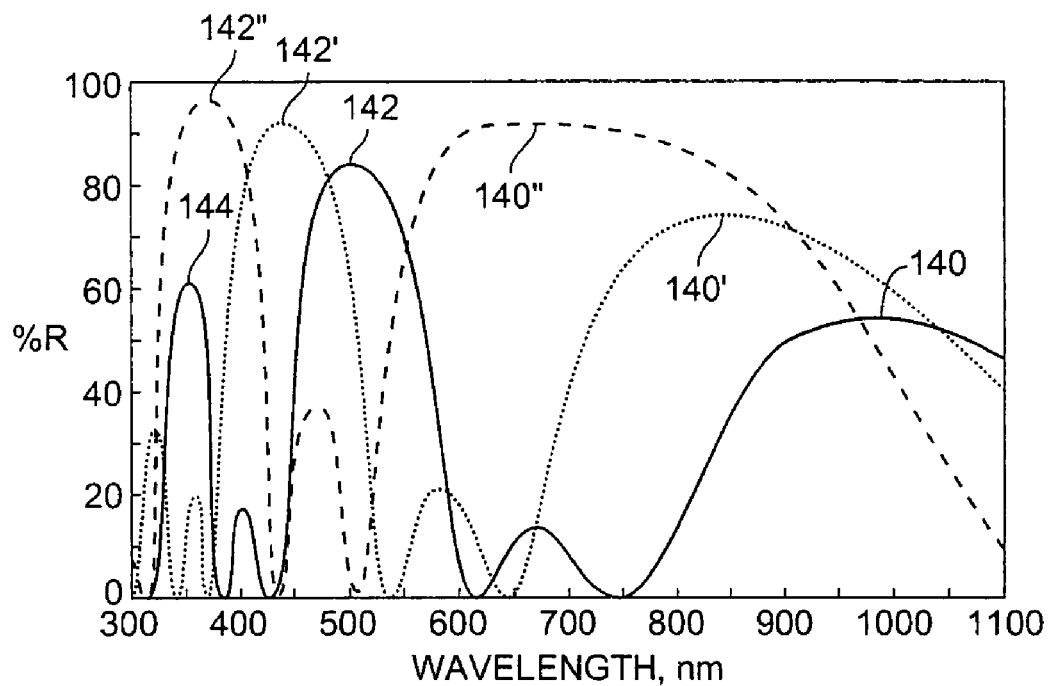
FIGS. 4A–4C illustrate the expected difference in optical performance between types of pigments.
Figure 4B:
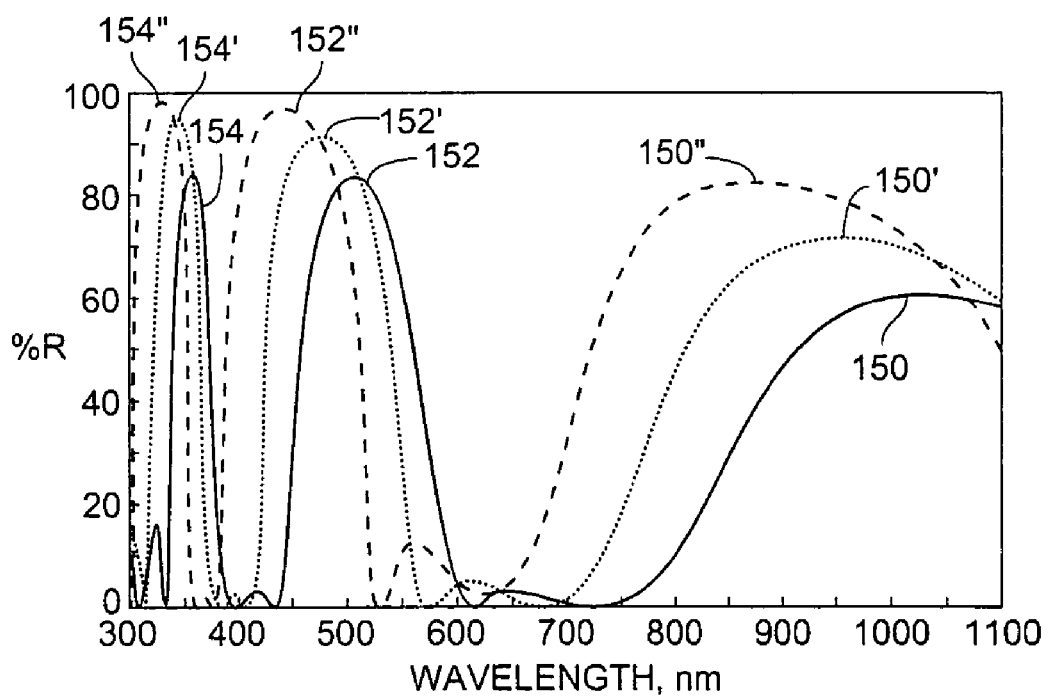
Figure 4C:
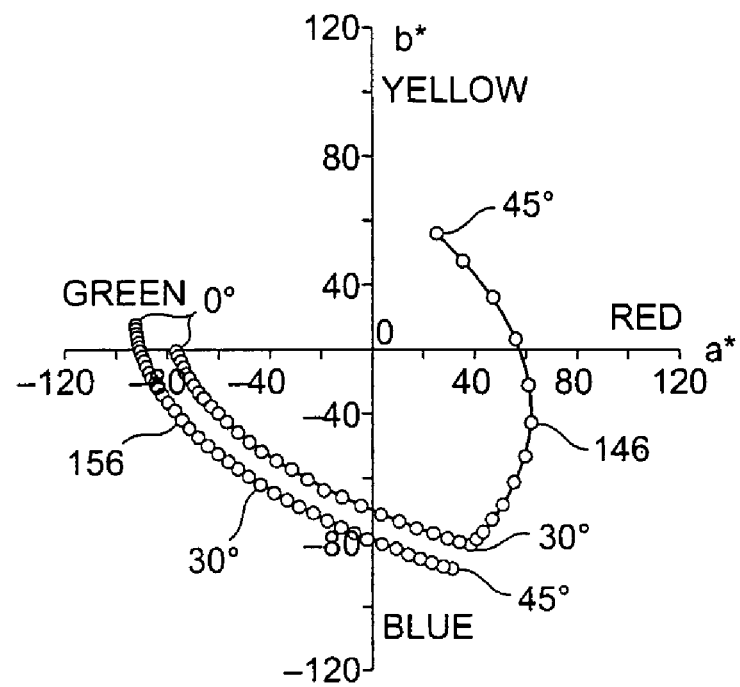

FIGS. 4A–4C illustrate the difference in optical performance between two families of pigments. The expected spectral reflectance of the pigment 0.5 H-1.5 L-0.5 H-1.5 L-0.5 H at $\lambda_o$=2000 nm is shown in FIG. 4A. The pigment 1.5 H-0.5 L-1.5 H-0.5 L-1.5 H at $\lambda_o$=2000 nm is shown in FIG. 4B. The color trajectories of the two pigments are compared in FIG. 4C. According to the rule, suppressed peaks are (N+1)=(3+1)=4, 8, and 12 for both examples. Reflectances of the pigments are analyzed at observation angles of 0 degrees, 30 degrees, and 45 degrees.

FIG. 4A shows reflectivity plots for the pigment flakes with relatively thicker low-index layers. The solid plot shows reflectivity at a viewing angle of 0 degrees, the dotted plot shows reflectivity at a viewing angle of 30 degrees, and the dashed plot shows reflectivity at a viewing angle of 45 degrees. When the viewing angle is 0 degrees, the 0.5 H-1.5 L-0.5 H-1.5 L-0.5 H pigment has a 1$^{st}$-order peak 140 at 910 nm, 2$^{nd}$-order peak 142 at 500 nm and 3$^{rd}$-order peak 144 at 350 nm on the curve of spectral reflectance. The 1$^{st}$-order peak 140 shifts to 840 nm (140') when the viewing angle is tilted 30 degrees and to 685 nm (140") when the viewing angle is tilted to 45 degrees.

The 2$^{nd}$-order peak 142 shifts to 440 nm (142') when the viewing angle tilts to 30 degrees and to 370 nm (142") when the viewing angle is tilted to 45 degrees. The 3$^{rd}$-order peak 144 is partially suppressed in the UV region at a normal viewing angle and does not contribute to the perceived color of the pigment.

Increasing the viewing angle causes further shift of the peaks to the left: peak 140' shifts to new position 140" at 685 nm and peak 142' shifts to new position 142" at 370 nm. The color of the pigment depends on positions of the reflectance peaks in the visible region. At a normal viewing angle, the 1$^{st}$-order peak is not visible and the color of the pigment is green (see FIG. 4C, 0 degrees) because the 2$^{nd}$-order peak 142 reflects green light at 505 nm. Tilting the viewing angle to 30 degrees causes travel of the color from green to blue because the 2$^{nd}$-order peak 142' reflects blue light at 440 nm while the 1$^{st}$-order peak 140' is still not visible at 840 nm. Increasing the tilt to 45 degrees shifts the 2$^{nd}$-order peak 142" into the invisible UV region, while the 1$^{st}$-order peak shifts down from the invisible near-infrared part of the spectrum to the red region. Referring to FIG. 4C, the color of the pigment gradually changes from blue through magenta to orange as the viewing angle is increased from 30 degrees to 45 degrees. Chroma (C*) for this pigment is 74, 83, and 52, respectively, at 0 degrees, 30 degrees and 45 degrees.

FIG. 4B shows reflectivity plots for the pigment flakes with relatively thicker high-index layers. The down-range shift of reflectance peaks for the 1.5 H-0.5 L-1.5 H-0.5 L-1.5 H pigment is not as pronounced as for the sample illustrated in FIG. 4A. At a normal viewing angle, the reflectivity plot looks very similar to the curve for the pigment shown in FIG. 4A. The 1$^{st}$-order peak 150 reflects at 1000 nm in near infrared region, the 2$^{nd}$-order peak 152 reflects at 500 nm, similar to the 2$^{nd}$-order peak 142 in FIG. 4A, and a majority of the 3$^{rd}$-order peak 154 is inside of the UV part of the spectrum and is invisible. As a result of reflectance of light at 500 nm, the color of the pigment is green (see FIG. 4C).

Higher viewing angles also shift reflectance peaks to the shorter wavelengths, but the shift distance is much less than for the example of FIG. 4A. As the pigment of FIG. 4B is tilted to 30 degrees, the 1$^{st}$-order peak shifts to 965 nm (150'), and to 880 nm (150") when tilted to 45 degrees. The 2$^{nd}$-order peak shifts to 475 nm (152') at 30 degrees and to 440 nm (152") at 45 degrees. The total down-range shift of the 2$^{nd}$-order peak (152-152") with the tilt from 0 degrees to 45 degrees is only 60 nm (from 500 nm to 440 nm) while the shift of the pigment illustrated in FIG. 4A is 130 nm (from 500 nm to 370 nm) under the same conditions. A result of short down-range shift of reflectance peaks is that the color travel of the pigment 1.5 H-0.5 L-1.5 H-0.5 L-1.5 H illustrated in FIGS. 4B and 4C is shorter that color travel of the 0.5 H-1.5 L-0.5 H-1.5 L-0.5 H pigment illustrated in FIGS. 4A and 4C. The color of the pigment represented in FIG. 4B travels from green through cyan to blue with increase of viewing angle from 0 degrees to 45 degrees.

Figure 5:
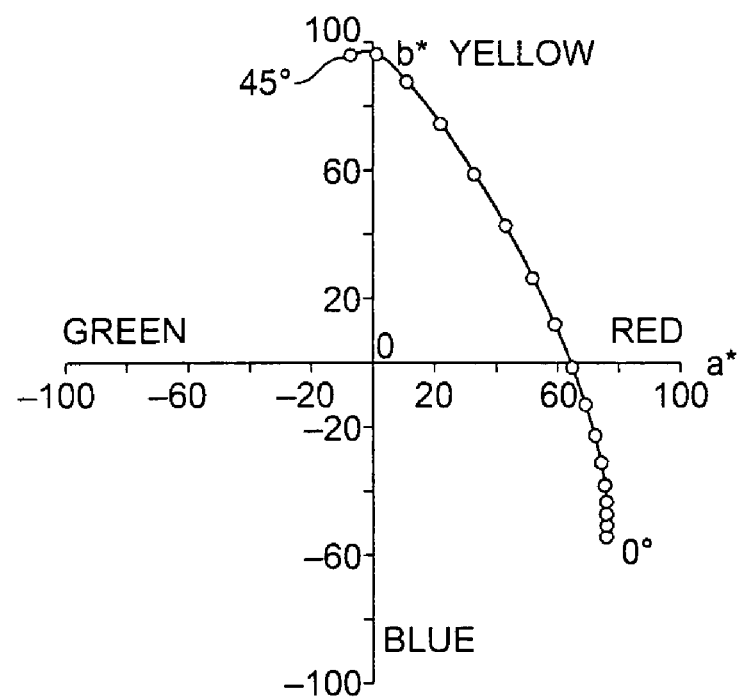
FIG. 5 is a color travel plot expected for an asymmetric, all-dielectric pigment flake design.

FIG. 5 is a color travel plot expected for an asymmetric, all-dielectric pigment flake design. An advantage of vacuum-deposited thin films (as opposed to sol-gel films, for example) is that it is possible to fabricate asymmetrical optical stacks enabling unique optical performance to the interference pigments. For example, with the optical design 2.49 H-0.87 L-1.31 H-0.67 L-1.33 H, with $\lambda_0=780$, the color travel for this asymmetric all-dielectric pigment flake is almost linear from bright magenta (0 degrees) to bright yellow (45 degrees). Chroma of the pigment is 94 at 0 degrees and 96 at 45 degrees, which provides excellent color. Vacuum deposition enables asymmetric all-dielectric pigment flakes, and the precise optical thickness control provided by vacuum deposition techniques, as opposed to techniques using weight-percentage as an indication of layer thickness, enables a wide variety of color-shifting pigment flakes with brilliant colors.

In alternative embodiments, peak regeneration or suppression in non-visible portions of the spectrum enable unique security devices. For example, an image printed with a pigment flake having a reflectance peak in the IR region at a high viewing angle, but little IR reflection at a normal viewing angle, enables a security device that is not easily detected or duplicated.

What is claimed is:

1. A dichroic pigment flake comprising: a plurality of thin film layers forming an optical interference structure with a $m^{th}$-order reflectivity peak, where m is an integer greater than 1, the $m^{th}$-order reflectivity peak having a first reflectivity at a first viewing angle and a second reflectivity at a second viewing angle, the first reflectivity and the second reflectivity being expressed as a percentage of total reflectivity, wherein the first reflectivity is less than the second reflectivity by at least 20%, wherein the plurality of thin-film layers are arranged as $(aH\ bL)^n\ aH$ wherein n is an integer and a and b are multipliers, H representing thin-film layers of high-index material having a relative index of refraction not less than 2.0 and a quarter-wave optical thickness at a center wavelength $\lambda$400 nm to 2200 nm, and L representing thin-film layers of low-index material having a relative index of refraction not greater than 1.6 and the quarter-wave optical thickness at the wavelength, and wherein a ratio a:b is an integer ratio between 1:4 and 4:1.

2. The dichroic pigment flake of claim 1 wherein the wavelength is between 700 nm and 2000 nm.

3. The dichroic pigment flake of claim 1 wherein each of the H layers comprises a first high-index material and each of the L layers comprises a first low-index material.

4. The dichroic pigment flake of claim 1 wherein a first H layer comprises a first high-index material and a second H layer comprises a second high-index material.

5. The dichroic pigment flake of claim 1 wherein n is greater than one and a first L layer comprises a first low-index material and a second L layer comprises a second low-index material.

6. The dichroic pigment flake of claim 1 wherein a=b and the wavelength is between 900 nm and 1300 nm.

7. The dichroic pigment flake of claim 6 wherein the dichroic pigment flake has a characteristic color at a normal viewing angle.

8. A coating composition comprising a carrier having a refractive index $n_c$, and plurality of dichroic pigment flakes suspended within said carrier, wherein the plurality of dichroic pigment flakes each comprise: a plurality of thin film layers forming an optical interference structure with a $m^{th}$-order reflectivity peak, where m is an integer greater than 1, the $m^{th}$-order reflectivity peak having a first reflectivity at a first viewing angle and a second reflectivity at a second viewing angle, the first reflectivity and the second reflectivity being expressed as a percentage of total reflectivity, wherein the first reflectivity is less than the second reflectivity by at least 20%, wherein the plurality of thin-film layers are arranged as $(aH\ bL)^n\ aH$ wherein n is an integer and a and b are multipliers, H representing thin-film layers of high-index material having a relative index of refraction not less than 2.0 and a quarter-wave optical thickness at a center wavelength $\lambda$400nm to 2200 nm, and L representing thin-film layers of low-index material having a relative index of refraction not greater than 1.6 and the quarter-wave optical thickness at the wavelength, and wherein a ratio a:b is an integer ratio between 1:4 and 4:1; and, wherein the refractive index $n_c$ of the carrier is less than 2.0.

9. A coating composition as defined in claim 8, wherein the composition is an ink or paint.

* * * * *